UNITED STATES PATENT OFFICE.

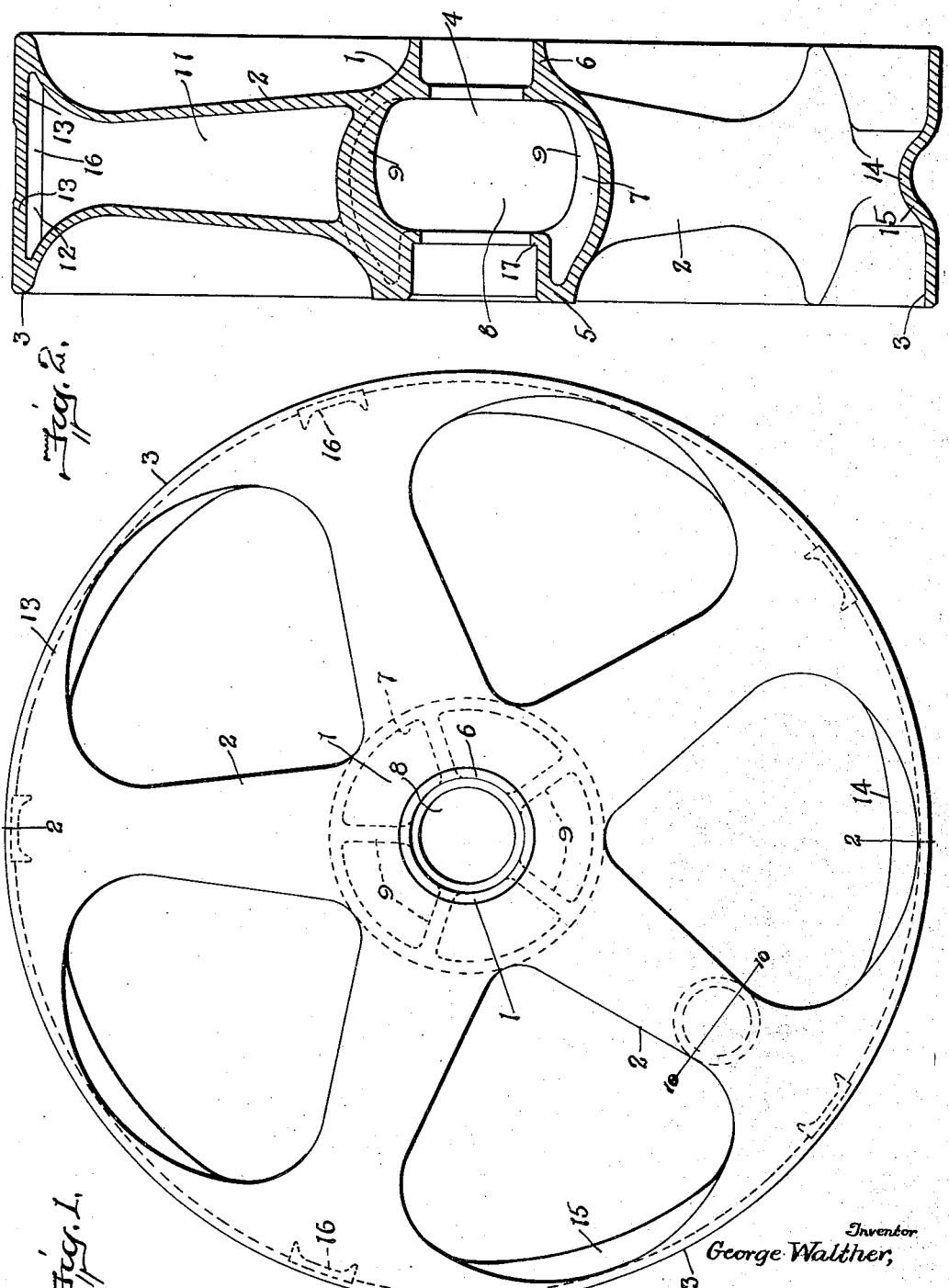

GEORGE WALTHER, OF DAYTON, OHIO, ASSIGNOR TO THE DAYTON STEEL FOUNDRY COMPANY, OF DAYTON, OHIO, A CORPORATION OF OHIO.

WHEEL.

1,346,864.      Specification of Letters Patent.      Patented July 20, 1920.

Application filed May 19, 1919. Serial No. 297,995.

*To all whom it may concern:*

Be it known that I, GEORGE WALTHER, a citizen of the United States, residing at Dayton, in the county of Montgomery and State of Ohio, have invented certain new and useful Improvements in Wheels, of which the following is a specification, reference being had therein to the accompanying drawing.

This invention relates to steel wheels of the general type shown in Design Patent #45,097 issued to me December 30, 1913, and has for its particular object to provide certain important structural features in wheels of this character.

An object sought in the design and construction of my improved wheel is to provide a wheel well balanced in lightness and strength, being light in weight but having relatively great strength and resiliency.

This object is realized in the present invention by casting the wheel integrally and portions thereof hollow in such a manner that strength is maintained and weight is materially reduced.

A further object sought in the design of the present invention is to provide a self-cleaning wheel, that is, a wheel having no pocket or flange formations whereby loose soil will be carried with the wheel in the operation thereof.

In the accompanying drawings:—

Figure 1 is a side elevation of my improved wheel, and

Fig. 2 is a vertical cross sectional view taken on the line 2—2 of Fig. 1.

As here shown, the wheel consists of the usual hub 1, spokes 2, and felly 3, formed integrally. The hub consists of an irregular cylindrical shaped body having a longitudinal aperture 4 therethrough to receive the spindle of an axle upon which the wheel may be mounted. The inner portion 5 of the hub is substantially larger than the outer portion 6 and has an inwardly projecting annular flange 17, and intermediate the portions 5 and 6 is an enlarged portion 7 which serves to provide enlarged base support to the spokes 2, thereby increasing the strength of the structure. To obtain lightness and resiliency the inner portion 5 and body portion 7 of the hub are cast hollow, as shown at 8, the hollow space being provided with a series of webs or radial sustaining walls 9 interposed between the walls of the hub and the flange 17 to maintain the strength of the hub.

The spokes 2 are substantially round or oval shaped in cross section on the line 10—10 of Fig. 1, gradually tapering outwardly or increasing in diameter toward the enlarged portion 7 of the hub and spreading abruptly at their base to form the juncture with the hub. Outwardly from the imaginary line 10—10 the walls of the spokes spread abruptly outwardly to form the juncture with the felly. As shown in Fig. 2, the spokes are hollow throughout their length, the longitudinal aperture 11 therein extending from the wall of the housing 7, which closes the inner end thereof, and opening into a hollow space 12 of the felly.

The felly 3 consists of two oppositely disposed rims 13—13 joined together at their inner edges by a series of concaved channels 14 interposed longitudinally between the apertures of the spokes, the walls of the channels forming a corresponding series of ribs or flanges 15 extending inwardly from the rims 13—13 and gradually fading at their opposite ends into the enlarged outer ends of the spokes. The rims 13—13 are further joined together by a series of transverse cross bars 16 which are located, as here shown, substantially on the longitudinal center line of the spokes and having their outer surfaces somewhat below the outer surface of the rims 13 to avoid machining thereof in the finishing operations of the wheel.

From the foregoing detailed description and the illustrations of the different figures of the drawings, the construction of my improved wheel will be readily understood. While the preferred arrangement of design and construction is substantially as here shown, it will be understood that changes may be made therein without materially departing from the principles of the invention.

Having thus fully described my invention, what I claim as new and desire to secure by Letters Patent, is:—

1. In a metal wheel, a hub having inner and outer portions and an enlarged intermediate portion, a longitudinal aperture extending through the hub and an annular aperture extending outwardly therefrom into said enlarged portion and laterally into the inner portion of the hub, strengthening walls interposed between said hub portions, and spokes and a felly supported thereon.

2. In a metal wheel, a hub having an inner portion having an inwardly projecting flange, and an enlarged body portion, a longitudinal aperture extending through the hub and an annular aperture extending outwardly therefrom into said enlarged portion and laterally into the inner portion of the hub, strengthening walls interposed between said flange and the outer walls of said hub, and spokes and a felly supported thereon.

3. A metal wheel consisting of a hub, hollow spokes and a felly, said hub having inner and outer portions and an enlarged intermediate portion, a longitudinal aperture extending through the hub and an annular aperture extending outwardly therefrom into said enlarged portion and laterally into the inner portion of the hub, the wall of said enlarged portion serving to close the inner end of the apertures in said spokes, and a strengthening wall disposed in the annular aperture of the hub adjacent each of said spokes.

4. A metal wheel consisting of a hub, hollow spokes and a felly, said hub having inner and outer portions and an enlarged intermediate portion, a longitudinal aperture extending through the hub and an annular aperture extending outwardly therefrom into said enlarged portion and laterally into the inner portion of the hub, the wall of said enlarged portion serving to close the inner end of the apertures in said spokes, and strengthening walls disposed in the annular aperture of the hub adjacent said spokes.

5. A metal wheel consisting of a hub, hollow spokes and a felly, said hub having inner and outer portions and an enlarged intermediate portion, a longitudinal aperture extending through the hub and an annular aperture extending outwardly therefrom into said enlarged portion and laterally into the inner portion of the hub, the wall of said enlarged portion serving to close the inner end of the aperture in said spokes and a plurality of strengthening walls arranged within said annular aperture.

6. A metal wheel consisting of a hub, hollow spokes and a felly, said felly having a plurality of oppositely disposed rims, joined together by a series of transverse bars, and a corresponding series of radial channels disposed between said spokes and communicating with the hollow spaces therein.

7. A metal wheel consisting of a hub, hollow spokes and a felly, said felly having a plurality of oppositely disposed rims, joined together by a series of transverse bars having their outer surfaces depressed below the periphery of said rims, and a corresponding series of radial channels disposed between said spokes and communicating with the hollow spaces therein.

8. A metal wheel consisting of a hub, hollow spokes and a felly, said felly having a plurality of oppositely disposed rims, joined together by a series of transverse bars adjacent the spokes and intersected by the longitudinal center line thereof, and a corresponding series of radial channels disposed between said spokes and communicating with the hollow spaces therein.

9. A metal wheel consisting of a hub, hollow spokes and a felly, said felly having a plurality of oppositely disposed rims joined together by interconnecting walls of a series of circumferentially extending channels communicating with the hollow portions of said spokes.

10. A metal wheel consisting of a hub, hollow spokes and a felly, said felly having a plurality of oppositely disposed rims joined together by interconnecting walls of a series of circumferentially extending channels communicating with the hollow portions of the spokes and having walls forming an inner flange of the felly and terminating in said spokes.

11. A metal wheel consisting of a hub, spokes and a felly, said felly having a plurality of oppositely disposed rims joined together by interconnecting walls of a series of circumferentially extending channels forming an inner flange of the felly and terminating in said spokes.

In testimony whereof I affix my signature.

GEORGE WALTHER.